United States Patent Office 3,523,890
Patented Aug. 11, 1970

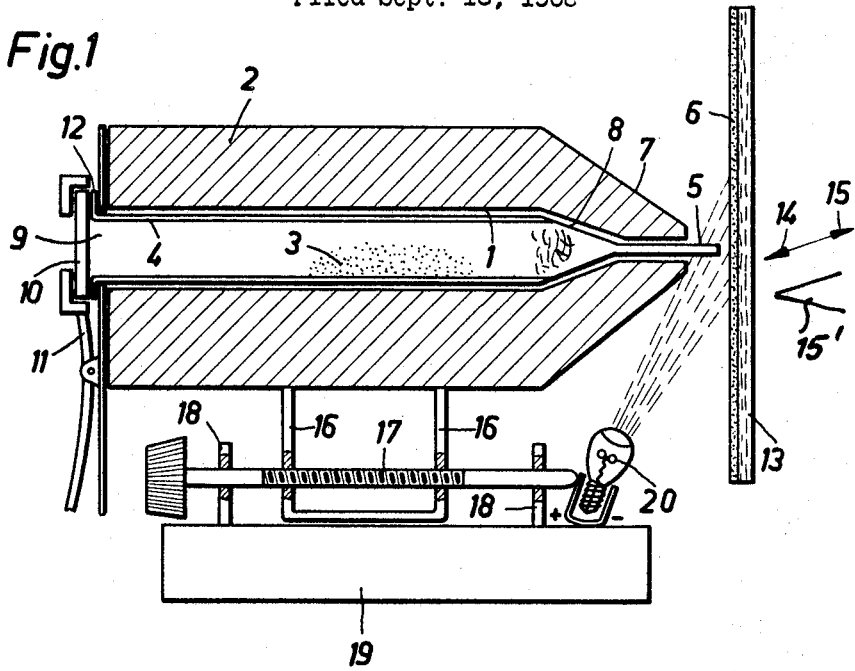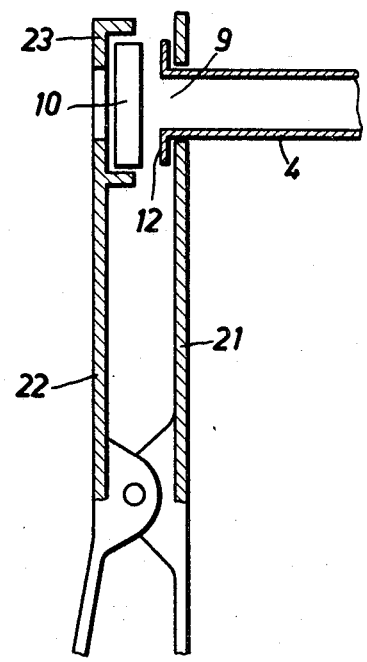

3,523,890
CHROMATOGRAPHIC METHOD AND APPARATUS
Egon Stahl, Auf den Hutten 25, Scheidt (Saar), Germany
Filed Sept. 18, 1968, Ser. No. 760,480
Claims priority, application Germany, Nov. 21, 1967, 1,673,097
Int. Cl. B01d 15/08
U.S. Cl. 210—31                    7 Claims

ABSTRACT OF THE DISCLOSURE

In order to determine or extract a volatile substance from a mixture, the mixture is placed in a glass cartridge with a solvent, the cartridge is heated and the volatile substance entrained by the solvent vapor leaves the cartridge through a capillary opening directing it onto a sheet of chromatographic material to form a deposit which can be subjected to chromatography.

---

The present invention relates generally to separation of mixtures of substances which sublime or evaporate on heating and more particularly to micro-analysis including the step of heating a sample so that a volatile or subliming component is evolved and leaves the rest of the substance in a solid condition.

Known methods for separating off one component of a sample substance include steam distillation, simple heating to cause sublimation, and solvent extraction. Present forms of these methods are, however, only applicable to a limited extent in micro-analysis since the physical transfer of the substances thus separated for further steps in analysis cannot be carried out without considerable losses of the separated material, or may, for some analytical techniques, be impossible.

A further known analytical method of separating volatile components from samples is gas-phase chromatography, in which the sample is placed in a heating block so that one or more components are sublimed or vaporised and are transported into a separation column by a hot carrier gas stream. A disadvantage of this method resides in that the sample for analysis, usually in the form of a powder, is introduced directly into the heating block, and heating takes place with the system closed and at a pressure above atmospheric. A gas stream is necessary for entraining the component to be identified and the non-volatile component of the sample remains in the apparatus as a carbonized residue.

One object of the present invention is to provide an improved method of treating a sample, and an apparatus for carrying out the method, free of the disadvantages of the above-mentioned analytical methods and apparatus.

The present invention consists in a method of treating a sample capable of giving off a vapor on heating comprising heating the sample in a vessel together with a carrier substance capable of evolving a vapor in the same temperature range as the sample, maintaining a sheet of material opposite an opening of the vessel for the formation of a deposit from vapor phase emerging from an opening, and subjecting the deposit while on the sheet to a chromatographical separation technique. The method is preferably applied to samples which contain a non-volatile component in addition to the component capable of giving off the vapor. The sheet can be in the form of paper or other material suitable for carrying out thin layer chromatography.

Preferably heating is carried out in a metal block having a hole into which the vessel, which can be in the form of a glass cartridge, can be placed. The exit opening of the vessel can be in the form of a capillary tube.

The invention also consists in an apparatus comprising a heating means in the form of a metal block, a vessel mounted in a hole in the block, the vessel having a capillary tube outlet directed away from the block, a sheet, adapted for the performance of chromatography, arranged at the outlet end of the tube, and means for moving the sheet, either in steps or continuously, in its own plane. Means can be provided for moving the block towards and away from the sheet. The vapor current evolved by the sample in the vessel, together with the carrier vapor, emerge through the capillary tube and form a deposit on the sheet as a dot of condensate.

In order to make a denser deposit on the sheet, an electrostatic field can be generated between the metal block and the sheet so that the vapor current emerging is focussed on the sheet for the formation of the deposit.

The vessel can conveniently be a thin-walled cartridge of glass which is closed at one end by means of a removable membrane. Preferably the cartridge tapers smoothly towards the capillary tube, for instance conically.

The membrane for closing the opening can, for instance be made of silicone rubber which is pressed against a marginal bead of the end of the cartridge by means of a clamping device. Such a cartridge, which can quickly and easily be introduced into the metal block, facilitates charging with sample and solvent for evolving the carrier vapor, provides for a hermetic seal and prevents the heating block becoming contaminated.

One embodiment of the invention is now described with reference to the accompanying diagrammatic drawing.

FIG. 1 is a side view and partial section of apparatus in accordance with the invention.

FIG. 2 shows a detail of the construction of the apparatus.

As shown in FIG. 1 the apparatus comprises a metal block 2 serving as a heating means. It can be held at any chosen temperature within a given range and is provided with a horizontal hole into which a charged glass cartridge 4 containing the sample 3 is inserted. The cartridge has a capillary tube or extension 5 at its right-hand end which ends at a position adjacent to a sheet 6 of a nature suitable for the performance of chromatography. Both the block 2 and the cartridge 4 taper conically towards the sheet 6, as is denoted by reference numerals 7 and 8. The cartridge 4 has a left-hand charging opening 9 which is closed by the membrane 10. The membrane is held in place by a clamping means 11 against the marginal bead 12 of the left-hand end of the cartridge. The carrying plate or support 13 on which the sheet 6 is mounted can be moved in a horizontal direction in its own plane as indicated by arrows 14, 15. This displacement can be caused manually or by means of a variable speed electric motor and can be in steps or can be continuous. The metal block 2 carries a lug 16 which has threaded holes through which a horizontal threaded spindle 17 passes. The spindle is carried in supports 18 mounted on a base plate 19. By turning the spindle 17 the metal block 2 with the cartridge 4 contained in it can be moved towards and away from the support plate 13. This arrangement enables the optimum distance between the end of the cartridge and the sheet 6 to be set quickly. A source 20 of light serves to cast a shadow of the right-hand end of the tube 5 on the sheet 6 in order to facilitate adjustment.

As shown in FIG. 2 the clamping means, denoted by reference numeral 11 in FIG. 1, comprises two limbs 21 and 22 of which one is arranged to fit round the end of the cartridge 4 for removing it from the block 2 while the other 23 has a recess holding the membrane 10 for closing the charging opening of the cartridge. The clamping means is provided with a spring for pressing the limb 22 towards the limb 21.

An electrostatic field, produced by applying a high voltage to the block 2 and a pointed electrode 15' behind the plate 13, can be used to focus, i.e. bundle, material about to impinge on the sheet in a more compact area. The field is concentrated by the pointed righ-hand end of block 2.

The invention is now described further with reference to the following examples.

EXAMPLE 1

Direct extraction of, and formation of a deposit with, the active principles of a mixture of caraway and fennel powders 20 mg. of the powders were placed in the cartridge which was then closed and introduced to the metal block heated at 250° C. 5 μl. toluene were introduced into the cartridge and vapor from the mixture was deposited on a silica gel sheet or layer and then subjected to chromatography, for example using dichloromethane as a solvent. From the finished chromatogram it was possible to recognize the principles of fennel and caraway (anethole, and carvone respectively). The time required for extraction and formation of the deposit amounted to one and a half minutes in all.

EXAMPLE 2

Identification of plasticizers in synthetic resins 50 mg. soft PVC were placed in the cartridge and heated to 250° C. For a supply of carrier vapor, 5 μl. of methylene chloride were then placed in the cartridge. The plasticizers were deposited on a silica gel layer and then developed with dichloromethane as a solvent. The chromatogram had a zone which disappeared in short-wave ultra-violet light and was at the same height as a comparison substance, dioctyl phthalate.

EXAMPLE 3

Detection of caffeine in various plant materials

The method can be applied for coffee, tea, cola, seeds, maté leaves and corresponding coffee and tea extracts.

25 mg. of the material to be examined or 15 mg. of extract were placed in the cartridge. The metal block was heated to 280° C. with an organic liquid to act as the carrier. The vapor stream emerging was caused to form a deposit on a silica gel layer or sheet. The deposit was then developed with a mixture of 95 parts by volume chloroform and 5 parts by volume of methanol. Caffeine could be recognized on the chromatogram in short-wave ultra-violet light as a spot which surpressed fluorescence.

EXAMPLE 4

Preparation of coumarin compounds from plant material 50 mg. of the pulverized plant material were placed in the cartridge and the latter was placed into the heating block at a temperature of 275° C. A sheet was moved slowly at a constant speed in its own plane so that a line of deposit was produced instead of a dot, and when the edge of the sheet was reached the direction of movement was reversed to produce a further line. Instead of using a solvent to produce an entraining vapor, nitrogen was slowly injected through the membrane of the cartridge by means of an injection needle. After a few minutes the coumarin compounds in the drug had formed a line deposit on the sheet. Finally development was carried out with a solvent in the normal manner. The separating effect could be recognized on examination under long-wave ultra-violet light and the fluorescing zones were cut out and extracted.

What I claim is:

1. A method of treating a sample capable of giving off a vapor on heating, comprising heating the sample in a vessel together with a carrier substance capable of evolving a vapor in the same temperature range as the sample, maintaining a sheet of material opposite an opening of the vessel for the formation of a deposit from vapor phase emerging from said opening, and subjecting the deposit while on the sheet to a chromatographic separation technique.

2. A method in accordance with claim 1 in which the sample contains a non-volatile component in addition to the component capable of giving off the vapor.

3. An apparatus comprising a heating means in the form of a metal block, a vessel mounted in a hole in the block, the vessel having a capillary tube outlet directed away from the block, a sheet, adapted for the performance of chromatography, arranged at the outlet end of the tube, and means for moving the sheet.

4. An apparatus in accordance with claim 3 in which a cartridge in the block tapers conically towards the capillary tube outlet, the apparatus further comprising a removable flexible membrane closing the charging opening of the cartridge, and disconnectable means holding the membrane in position.

5. An apparatus in accordance with claim 4 in which the disconnectable closing means comprises a pivoting lever with a free end with a recess for carrying the membrane.

6. An apparatus in accordance with claim 5 further comprising means for casting a shadow of an end of the capillary tube on the sheet to facilitate adjustment.

7. An apparatus in accordance with claim 3 comprising said block including a pointed end portion, means for establishing an electrostatic field at said pointed end portion of the block in order to focus material leaving the capillary tube outlet.

References Cited

FOREIGN PATENTS 1,032,096   6/1966   Great Britain.

JAMES L. DeCESARE, Primary Examiner

U.S. Cl. X.R.

210—198